Oct. 5, 1948.　　　　R. T. McELHOSE　　　　2,450,808
COUPLER FOR AIR LINES
Filed Jan. 25, 1946
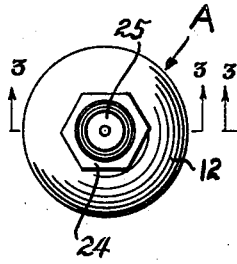
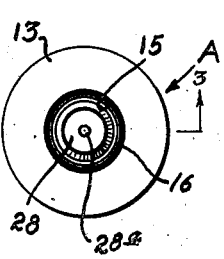
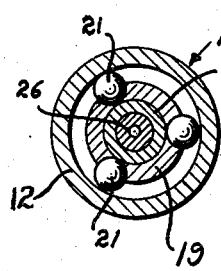
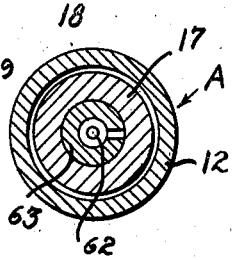
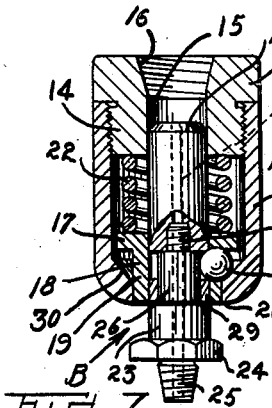
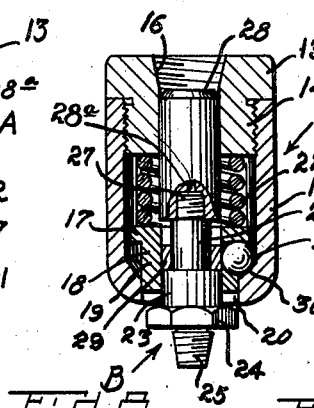
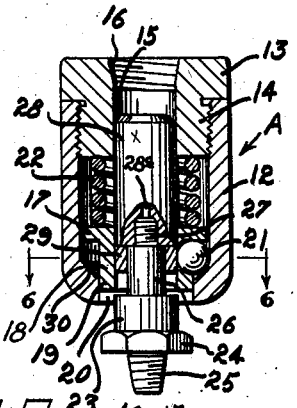
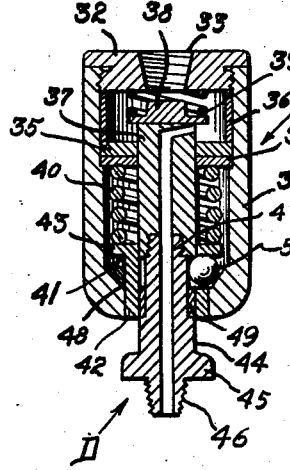
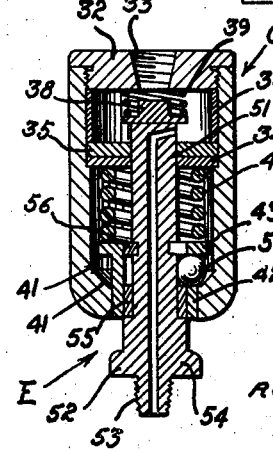
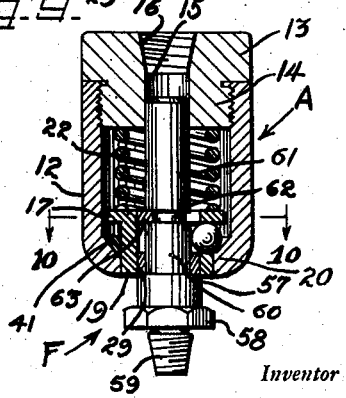
Inventor
ROBERT THEODORE McELHOSE
By
Attorneys Patented Oct. 5, 1948

2,450,808

UNITED STATES PATENT OFFICE 2,450,808

COUPLER FOR AIR LINES

Robert Theodore McElhose, Oakmont, Pa.

Application January 25, 1946, Serial No. 643,264

4 Claims. (Cl. 285—169)

The present invention relates to a novel and improved coupler which is especially but not necessarily, adapted for use in conjunction with so-called air lines and the obvious purpose of the invention is to structurally, functionally and otherwise improve upon prior couplers possessed of fundamentally similar characteristics.

The outstanding purpose of the invention is to provide a coupler construction characterized by male and female parts, the female part being connected to the air supply pipe or line, the male parts being readily connectible therewith and disconnectible therefrom and the accomplishment of this being with one hand only.

More specifically, the novelty is predicated upon a coupler characterized by a unique female unit having therein a friction ball clutch or grip device, this being bodily movable against the tension of a coacting spring, and said clutch device and spring being moved to a position to release the coacting male coupler unit in a feasible and practicable manner, the latter to be hereinafter specifically set forth.

Other objects, features and advantages of the invention will become more readily apparent from the following description and the accompanying illustrative drawings.

In the drawings, wherein like numerals are employed to designate like parts throughout the same:

Figure 1 is a top plan view of the coupler seen in Figure 3, this being one form of the invention herein depicted, described and claimed.

Figure 2 is a bottom plan view of the same.

Figure 3 is a central vertical sectional view, partly in elevation, this taken approximately on the plane of the line 3—3 of Figures 1 and 2, respectively, looking in the direction of the respective arrows.

Figure 4 is a view like Figure 3 showing the male coupler unit projecting into the female unit to a position necessary for actuating the ball clutch and releasing and disengaging said male unit.

Figure 5 is a view showing the units in the process of being separated for disengagement purposes.

Figure 6 is a horizontal section on the plane of the line 6—6 of Figure 5, looking in the direction of the arrows.

Figure 7 is a view similar to Figure 3 but showing a modified type of coupler construction.

Figure 8 is a view like Figure 7 but showing the male coupler unit of one-piece construction.

Figure 9 is a view based on the form of the invention seen in Figures 1 to 6, inclusive, this view serving to show the male coupler unit of one-piece construction.

Figure 10 is a horizontal section on the plane of the line 10—10 of Figure 9, this looking in the direction of the arrows.

Reference is had to the form of the invention shown in Figures 1 to 6, inclusive. This construction can best be seen, it is believed, in Figures 3 to 5, inclusive. In these latter figures it will be observed that the so-called outer or female coupler unit is denoted by the reference character A whereas the companion male coupler unit is generally denoted by the reference letter B. The part or unit A is characterized by a cylindrical shell 12 of appropriate proportions having a fitting 13 threaded as at 14 into one end. This fitting is provided with a bore or passage 15 and a screw threaded connection 16 which, in practice, is connected to the air supply pipe (not shown).

Fitted in the chamber in the cylinder 12 is a cage having a flange 17, said cage generally denoted by the numeral 18 and also including a sleeve portion 19 slidable in an accommodation hole 20. The sleeve is apertured to accommodate a series of circumferentially spaced friction clutch balls 21. A coiled spring is also in the chamber, said spring indicated at 22 and bearing against the flange 17 at one end and bearing against the plug 14 at the opposite end.

The male coupler unit comprises a cylindrical body or stem 23 having a tool nut 24 and a hose nipple 25. The stem also has a reduced portion 26 and a further reduced screw-threaded neck 27. This neck threads into a socket formed in one end of the pilot element 28. An air passage 28a is formed through the parts forming said male unit as shown, this in order to feed the air through the coupler in an obvious manner. I call attention to a release ring or collar 29 which fits between the sleeve 19 and surrounds the reduced stem portion 26. The interior of the cylindrical body 12 is tapered as at 30 to accommodate the clutch balls 21.

Figure 3 shows the coupler in its locked position. The balls 21 are resting in a cavity 30 between the stem 26 and the friction ring 29. To release coupler, the male part is pushed farther into the female part. When the male part has traveled in so far, it moves the ball cage 18 in until the balls 21 are free to be forced out of the space between ring 29 and pilot 28. Since the spring 22 is under compression the cage 18 is forced by the spring to move the balls forward and the balls grip the friction ring 29 tightly as shown in Figure 4, and since the friction ring is a sliding fit on plunger it is held stationary by the balls while the male coupler is being pulled out. As the male part is pulled out, the cavity between the pilot and the friction ring or collar is now closing, and as soon as the pilot comes in contact with said friction ring (as shown in Figure 5) it allows the balls to slide from the outside diameter of the friction ring to the outside diameter of the pilot 28, which must be equal to or smaller than the diameter of the ring 29, thus permitting the male part to be pulled all the way out.

Referring now to Figure 7 showing a modification, the female part or unit is denoted by the numeral C and the male unit by the reference numeral D. The assembly or unit C comprises a cylindrical casing 31 with a closing plug 32 in the threaded end, said plug 32 having a screw hole 33 and serving to hold in place a centrally apertured partition or guide washer 34, this being held against the shoulder as shown and serving to accommodate the packing washer 35 and a sleeve 36. This forms sort of a chamber for the pilot end 37 of the female coupler unit. In this particular instance there is a valve element 38 coacting with the passage 33 and normally pressed to closed position by a suitable coiled spring 39. The larger coiled spring 40, as before indicated, coacts with the cage 41, said cage having a sleeve 42 and flange 43, the sleeve operating in an aperture in the body or shell 31 as shown. Here again the male coupler unit has telescopic connection with the female unit and passes through the opening in the bottom and through the guide opening in the parts 34 and 35 and engages the valve 38. The main stem part 44 has a tool nut 45, a nipple 46 and a threaded neck 47 on the reduced portion 48, the latter surrounded by the release ring or collar 49 and coacting friction clutch or gripping balls 50.

All of the parts in the female coupler unit seen in Figure 8 are identical with those seen in Figure 7 and are therefore designated by the same reference numerals, this to avoid confusion. The male coupler unit is however, differentiated by the letter E and this comprises the single stem 51 with a passage therethrough for delivery of the air, said stem having a tool nut 52, a nipple 53 for the hose, a main body or shoulder portion 54 for the collar 55. The stem is provided with a horseshoe washer 56 fitting into a suitable groove provided therefor.

Referring now to the modification seen in Figure 9 it is to be explained that as far as the female coupler unit is concerned it is exactly the same in construction as the one seen in Figures 3, 4 and 5 and therefore the same numerals are employed to designate the same parts. The male coupler unit is like the one shown in Figure 8, that is, it is a one-piece instead of a two-piece construction as in Figures 1 to 7. To avoid difficulties this particular unit may be differentiated by the reference letter F, the same comprising a one-piece stem including the relatively large shoulder portion 57, tool flange or nut 58 and associated hose accommodation nipple 59. The main shank of the stem composed of integrated parts 60 and 61 is formed with a groove 62 to accommodate a horseshoe washer 63 operating in the sleeve portion 19 of the ball cage.

The operation of the modification seen in Figures 7, 8 and 9 is the same as that already described in connection with Figures 3, 4 and 5 and therefore repetition of such description is considered not essential.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. A female coupler unit for use in association with a coupler construction of the class described comprising a cylindrical shell, a fitting including a centrally apertured plug closing one end of said shell, the opposite end of said shell being provided with an internal tapered seat defining a cavity, and a central opening to permit insertion and removal of a coacting male coupler unit, a ball cage comprising a sleeve slidable in said central opening, said sleeve having an outstanding flange, a coiled spring in said shell resting at one end against the flange and at the opposite end against said fitting, said sleeve having friction ball openings, and a plurality of friction balls mounted in said openings, together with a male coupler unit comprising a stem projecting into said shell by way of said flanged sleeve and then into the aforementioned fitting, said stem having a portion with which said balls coact, said reduced portion constituting a shoulder, and a collar surrounding said reduced portion and resting on said shoulder, said collar coacting with said balls for projecting and retracting same at predetermined periods of operation.

2. As a new article of manufacture, a male coupler unit for use in association with a female unit of the class described comprising a rectilinearly straight and centrally bored stem, said stem being provided at one end with a screw threaded nipple for attachment to a hose, the intermediate portion being reduced in diameter and defining a shoulder, and a ring-like collar having friction sliding fit on said reduced portion and engaging said shoulder.

3. As a new article of manufacture and as a component part of an air hose coupler construction of the class described, a female coupler unit comprising a cylindrical shell having an opening at one end for insertion and removal of a coacting male unit, a fitting plugged into the opposite end of said shell, the interior end of said shell being provided with a shoulder, a washer in said shell seated on said shoulder, a packing ring in said shell and superposed on said washer, and a sleeve mounted in said shell and engaging said packing ring, said sleeve being held in place by said fitting, and a spring pressed valve element in the chamber defined by said sleeve, fitting, and packing ring.

4. Coupler means for air lines and the like comprising a female coupler unit embodying a cylindrical shell constituting a casing, a screw-threaded fitting threaded into one end of the shell and closing the same and provided with a central aperture to accommodate an air supply pipe or the like, the opposite end of the shell being centrally apertured to accommodate a sliding sleeve and an insertable and removable male coupler unit, the last-named end portion of the shell being interiorly tapered to provide a friction ball reception and expanding and contracting cavity, a ball cage comprising an annular sleeve slidable in said central opening, the inner confined end portion of said sleeve being provided with an outstanding annular flange, a coiled spring in said shell and resting at one end against the flange and at its opposite end against the fitting, said sleeve being cylindrical in cross section and provided with friction ball openings, a plurality of friction balls mounted in said ball openings and coacting with the tapered wall portion of the cavity, a male coupler unit embodying a stem, said stem being insertable into the shell by way of said central opening and sleeve fitting into said opening, and a collar surrounding said stem and fitting slidably within the bore of said sleeve.

ROBERT THEODORE McELHOSE.

REFERENCES CITED

The following references are of record in the file of this patent:

UNITED STATES PATENTS

| Number | Name | Date |
| --- | --- | --- |
| 651,747 | Cederstrom | June 12, 1900 |
| 1,179,971 | Stichler | Apr. 18, 1916 |
| 1,337,288 | Stichler | Apr. 20, 1920 |
| 2,069,377 | Matthiessen | Feb. 2, 1937 |